United States Patent
Nakashima et al.

(10) Patent No.: US 11,365,331 B2
(45) Date of Patent: Jun. 21, 2022

(54) LATEX OF THE HIGHLY SATURATED NITRILE RUBBER AND ADHESIVE COMPOSITION

(71) Applicant: ZEON CORPORATION, Tokyo (JP)

(72) Inventors: Tomonori Nakashima, Tokyo (JP); Osamu Senda, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 17/009,147

(22) Filed: Sep. 1, 2020

(65) Prior Publication Data

US 2021/0002522 A1 Jan. 7, 2021

Related U.S. Application Data

(62) Division of application No. 15/127,824, filed as application No. PCT/JP2015/059110 on Mar. 25, 2015, now abandoned.

(30) Foreign Application Priority Data

Mar. 27, 2014 (JP) ................. 2014-064989

(51) Int. Cl.
| | | |
|---|---|---|
| *C09J 109/04* | (2006.01) | |
| *B32B 7/12* | (2006.01) | |
| *B32B 25/10* | (2006.01) | |
| *C08L 9/04* | (2006.01) | |
| *C09J 161/14* | (2006.01) | |
| *C08F 236/12* | (2006.01) | |
| *C08C 19/02* | (2006.01) | |
| *C08K 7/02* | (2006.01) | |

(52) U.S. Cl.
CPC ............... *C09J 109/04* (2013.01); *B32B 7/12* (2013.01); *B32B 25/10* (2013.01); *C08C 19/02* (2013.01); *C08F 236/12* (2013.01); *C08K 7/02* (2013.01); *C08L 9/04* (2013.01); *C09J 161/14* (2013.01); *B32B 2255/10* (2013.01); *B32B 2255/26* (2013.01)

(58) Field of Classification Search
CPC ...... C09J 109/04; C09J 161/14; C08F 236/12; C08C 19/02; C08L 9/04; C08K 7/02; B32B 25/10; B32B 2255/10; B32B 2255/26
See application file for complete search history.

(56) References Cited

U.S. PATENT DOCUMENTS

| | | | | |
|---|---|---|---|---|
| 3,891,722 A | * | 6/1975 | Miloscia | ............... C08F 236/04 525/261 |
| 5,651,995 A | | 7/1997 | Oyama et al. | |
| 2010/0256294 A1 | | 10/2010 | Ikeda et al. | |
| 2012/0130005 A1 | * | 5/2012 | Senda | .................... C09J 109/04 524/511 |

FOREIGN PATENT DOCUMENTS

| | | |
|---|---|---|
| CN | 102471420 A | 5/2012 |
| JP | H06-286015 A | 10/1994 |

OTHER PUBLICATIONS

Jun. 9, 2015 International Search Report issued in International Patent Application No. PCT/JP2015/059110.
Feb. 7, 2019 Office Action issued U.S. Appl. No. 15/127,824.
ASTM D1646-17—Standard Test Methods for Rubber—Viscosity, Stress Relaxation, and Pre-Vulcanization Characteristics (Mooney Viscometer) (Year: 2017).
Jul. 8, 2019 Office Action issued in U.S. Appl. No. 15/127,824.
Oct. 29, 2019 Office Action issued U.S. Appl. No. 15/127,824.
Apr. 13, 2020 Office Action issued in U.S. Appl. No. 15/127,824.
U.S. Appl. No. 15/127,824, filed Sep. 21, 2016 in the name of Nakashima et al.

* cited by examiner

*Primary Examiner* — Jeremy R Pierce
(74) *Attorney, Agent, or Firm* — Oliff PLC

(57) ABSTRACT

A latex of a highly saturated nitrile rubber wherein the highly saturated nitrile rubber contains α,β-ethylenically unsaturated nitrile monomer units in a ratio of 10 to 60 wt %, has an iodine value of 120 or less, and has a weight average molecular weight of solubles in chloroform of 100,000 or less, and when removing volatiles contained in the latex and making a film of the highly saturated nitrile rubber, a loss tangent tan $\delta_{(50°\ C.)}$ at 50° C. of the film is 0.3 to 0.6 and a complex torque S* at the time of 100% shear strain at 100° C. of the film is 20 dNm or less, and an adhesive composition containing the latex are provided.

7 Claims, No Drawings

LATEX OF THE HIGHLY SATURATED NITRILE RUBBER AND ADHESIVE COMPOSITION

This application is a Divisional of application Ser. No. 15/127,824, filed Sep. 21, 2016 (now abandoned), which is a national stage of PCT/JP2015/059110, filed Mar. 25, 2015, which claims priority to Japanese Application No. 2014-064989, filed Mar. 27, 2014. The entire contents of the prior applications are hereby incorporated by reference herein in their entirety.

CROSS-REFERENCE TO RELATED APPLICATIONS

None.

TECHNICAL FIELD

The present invention relates to a latex of a highly saturated nitrile rubber and an adhesive composition containing the same.

BACKGROUND ART

Composites of rubber and fiber are being used in numerous fields such as belts, rubber hoses, and diaphragms. In the field of belts, there are timing belts for automobile use, poly ribbed belts, lapped belts, V-belts, etc. These are usually comprised of composites of woven fabric-shaped base and rubber. For example, in V-belts, the belts are surrounded by canvas for protection, while in toothed belts, the tooth parts have covering fabric laminated over them.

As the rubber, in the past, the oil resistant rubbers of chloroprene rubber and acrylonitrile-butadiene copolymer rubber had mainly been used, but in recent years, to deal with automobile emission regulations, the smaller engine compartments for lightening the weight of automobiles, the closed engine compartments for reducing noise, etc., heat resistance is demanded. For this reason, highly saturated nitrile rubber provided with both heat resistance and oil resistance has come to be used.

In this regard, if using a timing belts as an example, the tooth parts are protected by nylon base fabric. In the timing belts, the base fabric, in general, has been treated by a solvent-based rubber glue in order to raise the bonding strength of the rubber and the base fabric and suppress abrasion due to intermeshing of the belt and gear. However, recently, to eliminate environmental pollution due to organic solvents, art for treatment by an aqueous binder in place of treatment by a solvent-based rubber glue has been desired.

As such art for treatment by an aqueous binder, Patent Document 1 discloses an adhesive composition which contains a carboxyl group-containing highly saturated nitrile rubber latex and resorcinol formaldehyde resin. However, the fiber base material-highly saturated nitrile rubber composite obtained by using this adhesive composition to bond a fiber base material and highly saturated nitrile rubber is not necessarily sufficient in abrasion resistance. For this reason, it has not been possible to sufficiently respond to the recent trend toward higher performance of engine compartments of automobiles.

RELATED ART DOCUMENTS

Patent Documents

Patent Document 1: Japanese Patent Publication No. 6-286015A

DISCLOSURE OF THE INVENTION

Problem to be Solved by the Invention

An object of the present invention is to provide an adhesive composition which can form an adhesive layer excellent in stretchability and abrasion resistance and is to provide a latex of a highly saturated nitrile rubber used for this adhesive composition.

Means for Solving the Problems

The inventors engaged in intensive studies on a highly saturated nitrile rubber forming a latex which is an ingredient of an adhesive composition, for achieving the above object and as a result discovered that by controlling the weight average molecular weight of the solubles in chloroform to 100,000 or less and making the loss tangent tan $\delta_{(50°\,C.)}$ at 50° C. when made into a film and making the complex torque S* at the time of 100% shear strain at 100° C. predetermined ranges, it is possible to achieve the above object and thereby completed the present invention.

That is, according to the present invention, there is provided a latex of a highly saturated nitrile rubber which contains 10 to 60 wt % of α,β-ethylenically unsaturated nitrile monomer units, has an iodine value of 120 or less, and has a weight average molecular weight of solubles in chloroform of 100,000 or less, and when removing volatiles contained in the latex and making a film of the highly saturated nitrile rubber, a loss tangent tan $\delta_{(50°\,C.)}$ at 50° C. of the film is 0.3 to 0.6 and a complex torque S* at the time of 100% shear strain at 100° C. of the film is 20 dNm or less.

In the latex of a highly saturated nitrile rubber of the present invention, preferably, when removing volatiles contained in the latex and making a film of the highly saturated nitrile rubber, a difference $\Delta \tan \delta = \tan \delta_{(150°\,C.)} - \tan \delta_{(50°\,C.)}$, which is a difference of the loss tangent tan $\delta_{(50°\,C.)}$ at 50° C. and a loss tangent tan $\delta_{(150°\,C.)}$ at 150° C. of the film, is 0.35 or less.

In the latex of a highly saturated nitrile rubber of the present invention, preferably when removing volatiles contained in the latex and making a film of the highly saturated nitrile rubber, a storage modulus $G'_{(100°\,C.)}$ at 100° C. of the film is 200 kPa or less.

In the latex of a highly saturated nitrile rubber of the present invention, preferably the highly saturated nitrile rubber contains 10 to 60 wt % of α,β-ethylenically unsaturated nitrile monomer units, 0.1 to 20 wt % of acid group-containing α,β-ethylenically unsaturated monomer units, 20 to 89.9 wt % of and diene monomer units and/or α-olefin monomer units.

Further, preferably the latex of a highly saturated nitrile rubber of the present invention is one obtained by emulsion polymerization of a monomer forming the highly saturated nitrile rubber and the latex of a highly saturated nitrile rubber is one obtained through a process of not adding a molecular weight modifier at the time of start of emulsion polymerization and adding 1 to 3 parts by weight of a molecular weight modifier, after start of emulsion polymerization, with respect to 100 parts by weight of the monomers used for polymerization at the stage of a 5 to 60 wt % polymerization conversion rate.

Further, according to the present invention, there is provided an adhesive composition containing a latex of a highly saturated nitrile rubber of the present invention.

The adhesive composition of the present invention preferably further contains a resorcinol formaldehyde resin.

Further, the content of the resorcinol formaldehyde resin is preferably 5 to 30 parts by weight with respect to 100 parts by weight of a solid content of the latex of a highly saturated nitrile rubber.

Furthermore, according to the present invention, there is provided a fiber base material-highly saturated nitrile rubber composite obtained by bonding a fiber base material and a highly saturated nitrile rubber using the adhesive composition of the present invention.

Effects of the Invention

The adhesive composition of the present invention using a latex of the highly saturated nitrile rubber of the present invention can form an adhesive layer which is excellent in stretchability (which requires low load for stretching to predetermined ratio) and abrasion resistance. Further, by using such an adhesive composition of the present invention as an adhesive, it is possible to improve the stretchability after treating the fiber base material with the adhesive composition and, further, obtain a composite excellent in abrasion resistance.

DESCRIPTION OF EMBODIMENTS

Latex of the Highly Saturated Nitrile Rubber

The latex of the highly saturated nitrile rubber of the present invention comprises highly saturated nitrile rubber containing 10 to 60 wt % of α,β-ethylenically unsaturated nitrile monomer units, having an iodine value of 120 or less, and having a weight average molecular weight of solubles in chloroform of 100,000 or less. When removing the volatiles contained in the latex and forming a film of the highly saturated nitrile rubber, the film is provided with the later explained specific properties.

The α,β-ethylenically unsaturated nitrile monomer forming the α,β-ethylenically unsaturated nitrile monomer units contained in the highly saturated nitrile rubber forming the latex of the present invention is not particularly limited, but one which has 3 to 18 carbon atoms is preferable, while one which has 3 to 9 carbon atoms is particularly preferable. As specific examples, acrylonitrile, methacrylonitrile, α-chloroacrylonitrile, etc. may be mentioned. Among these as well, acrylonitrile is preferable. These α,β-ethylenically unsaturated nitrile monomer may be used as single types alone or as a plurality of types.

In the highly saturated nitrile rubber forming the latex of the present invention, the content of the α,β-ethylenically unsaturated nitrile monomer units is 10 to 60 wt %, preferably 20 to 50 wt %, more preferably 25 to 45 wt %. If the content of the α,β-ethylenically unsaturated nitrile monomer units is too small, the highly saturated nitrile rubber is liable to be inferior in oil resistance, while conversely if too large, the cold resistance may fall.

Further, the highly saturated nitrile rubber forming the latex of the present invention preferably contains, in addition to the α,β-ethylenically unsaturated nitrile monomer, acid group-containing α,β-ethylenically unsaturated monomer units from the viewpoint of improvement of the adhesion and abrasion resistance.

The acid group-containing α,β-ethylenically unsaturated monomer forming the acid group-containing α,β-ethylenically unsaturated monomer units is a monomer containing α,β-ethylenically unsaturated bonds and an acid group in its molecule. The acid group is not particularly limited and may be any of a carboxyl group, sulfonic acid group, phosphoric acid group, etc., but a carboxyl group is preferable. As the acid group-containing α,β-ethylenically unsaturated monomer, one which has 3 to 18 carbon atoms is preferable, while one which has 3 to 9 carbon atoms is particularly preferable.

As the α,β-ethylenically unsaturated monomer having a carboxyl group, in addition to an α,β-ethylenically unsaturated monocarboxylic acid, α,β-ethylenically unsaturated dicarboxylic acid, and α,β-ethylenically unsaturated dicarboxylic acid monoester, an α,β-ethylenically unsaturated dicarboxylic acid anhydride which is able to change to a compound having a carboxyl group may be mentioned.

As the α,β-ethylenically unsaturated monocarboxylic acid, acrylic acid, methacrylic acid, ethacrylic acid, crotonic acid, cinnamic acid, etc. may be mentioned.

As the α,β-ethylenically unsaturated dicarboxylic acid, maleic acid, fumaric acid, itaconic acid, citraconic acid, chloromaleic acid, etc. may be mentioned.

As the α,β-ethylenically unsaturated dicarboxylic acid monoester, monomethyl maleate, monoethyl maleate, monobutyl maleate, monocyclohexyl maleate, monomethyl fumarate, monoethyl fumarate, monobutyl fumarate, mono-2-hydroxyethyl fumarate, monocyclohexyl fumarate, monomethyl itaconate, monoethyl itaconate, monobutyl itaconate, etc. may be mentioned.

As the α,β-ethylenically unsaturated dicarboxylic acid anhydride, maleic anhydride, itaconic anhydride, citraconic anhydride, etc. may be mentioned.

Among these as well, an α,β-ethylenically unsaturated monocarboxylic acid is preferable, an α,β-ethylenically unsaturated monocarboxylic acid which has 3 to 9 carbon atoms is more preferable, acrylic acid and methacrylic acid are further preferable, and methacrylic acid is particularly preferable.

In the highly saturated nitrile rubber forming the latex of the present invention, the content of the acid group-containing α,β-ethylenically unsaturated monomer units is preferably 0.1 to 20 wt %, more preferably 0.5 to 10 wt %, particularly preferably 1 to 6 wt %. By copolymerizing the acid group-containing α,β-ethylenically unsaturated monomer in the above range, the obtained adhesive layer can be improved in adhesion and abrasion resistance.

Further, the highly saturated nitrile rubber forming the latex of the present invention preferably further contains diene monomer units and/or α-olefin monomer units from the viewpoint of improvement of the adhesion by improving the rubbery modulus.

As the diene monomer forming the diene monomer units, conjugated dienes which has 4 or more carbon atoms such as 1,3-butadiene, isoprene, 2,3-dimethyl-1,3-butadiene, and 1,3-pentadiene and nonconjugated dienes which has 5 to 12 carbon atoms such as 1,4-pentadiene and 1,4-hexadiene may be mentioned. Among these, conjugated dienes are preferable, while 1,3-butadiene is more preferable.

As the α-olefin monomer forming the α-olefin monomer units, one which has 2 to 12 carbon atoms is preferable. Ethylene, propylene, 1-butene, 4-methyl-1-pentene, 1-hexene, 1-octene, etc. may be mentioned.

In the highly saturated nitrile rubber forming the latex of the present invention, the content of the diene monomer units and/or α-olefin monomer units is preferably 20 to 89.9 wt %, more preferably 40 to 79.5 wt %, particularly preferably 49 to 74 wt %.

Furthermore, the highly saturated nitrile rubber forming the latex of the present invention may be a copolymer obtained by further copolymerizing copolymerizable other monomer which can copolymerize with an α,β-ethylenically unsaturated nitrile monomer, acid group-containing α,β-ethylenically unsaturated monomer, and a diene and/or α-olefin. As the content of the units of the copolymerizable other monomer in the highly saturated nitrile rubber, 30 wt % or less is preferable, 10 wt % or less is more is preferable, and 5 wt % or less is particularly preferable.

As such a copolymerizable other monomer, an aromatic vinyl, α,β-ethylenically unsaturated monocarboxylic acid ester, fluoroolefin, copolymerizable antiaging agent, etc. may be mentioned.

As the aromatic vinyl, styrene and a styrene derivative which has 8 to 18 carbon atoms may be mentioned. As specific examples of the styrene derivative, α-methylstyrene, vinylpyridine, etc. may be mentioned.

As the α,β-ethylenically unsaturated monocarboxylic acid ester, an ester of an α,β-ethylenically unsaturated monocarboxylic acid and an aliphatic alcohol which has 1 to 12 carbon atoms may be mentioned. As specific examples, methyl(meth)acrylate (meaning methyl acrylate and/or methyl methacrylate, same below), butyl(meth)acrylate, methoxyethyl (meth)acrylate, trifluoroethyl(meth)acrylate, tetrafluoropropyl(meth)acrylate, etc. may be illustrated.

As the fluoroolefin, an unsaturated fluorine compound which has 2 to 12 carbon atoms may be mentioned. As specific examples, difluoroethylene, tetrafluoroethylene, fluoroethylvinyl ether, fluoropropylvinyl ether, o-trifluoromethylstyrene, vinyl pentafluorobenzoate, etc. may be mentioned.

As specific examples of the copolymerizable antiaging agent, N-(4-anilinophenyl)acrylamide, N-(4-anilinophenyl) methacrylamide, N-(4-anilinophenyl) cinnamamide, N-(4-anilinophenyl) crotonamide, N-phenyl-4-(3-vinyl benzyloxy) aniline, N-phenyl-4-(4-vinyl benzyloxy) aniline, etc. may be mentioned.

The highly saturated nitrile rubber of the latex forming the present invention has a Mooney viscosity ($ML_{1+4}$, 100° C.) of preferably 10 to 300, more preferably 20 to 250, particularly preferably 30 to 200. If the Mooney viscosity is too low, the mechanical properties of the composite obtained which is bonded by the adhesive composition of the present invention are liable to fall. On the other hand, if too high, the processability may deteriorate.

Further, the highly saturated nitrile rubber forming the latex of the present invention has an iodine value of 120 or less, preferably 80 or less, more preferably 60 or less, particularly preferably 30 or less. If the iodine value is too high, when an adhesive layer is made with the latex, the obtained adhesive layer is liable to fall in heat aging resistance or ozone resistance.

Furthermore, the highly saturated nitrile rubber forming the latex of the present invention has a weight average molecular weight (Mw) of the solubles in chloroform of 100,000 or less, preferably 10,000 to 90,000, more preferably 20,000 to 80,000. If the weight average molecular weight of the solubles in chloroform is too large, the obtained adhesive layer ends up deteriorating in stretchability. The weight average molecular weight of the solubles in chloroform can, for example, be found by making the highly saturated nitrile rubber dissolve in chloroform and measuring the solubles of the obtained solution using gel permeation chromatography. Note that, the molecular weight distribution (Mw/Mn) of the solubles in chloroform is not particularly limited, but is preferably 2 to 100, more preferably 2.5 to 50.

Note that, the method of making the weight average molecular weight of the solubles in chloroform of the highly saturated nitrile rubber, which forms the latex of the present invention, the above range is not particularly limited, but, for example, when producing the highly saturated nitrile rubber forming the latex of the present invention by emulsion polymerization, the method of not adding a molecular weight modifier at the time of start of polymerization but adding a molecular weight modifier in the middle of the emulsion polymerization may be mentioned. In such a method, it is possible to adjust the timing when adding a molecular weight modifier in the middle of the process and the amount of addition when adding a molecular weight modifier in the middle of the process so as to adjust the weight average molecular weight of the solubles in chloroform.

Further, the latex of the present invention is one where when removing the volatiles contained in the latex and making the highly saturated nitrile rubber forming the latex of the present invention a film, the properties of the film are in the ranges explained below.

That is, in the latex of the present invention, the loss tangent tan $\delta_{(50°\ C.)}$ at 50° C. when making the highly saturated nitrile rubber forming the latex of the present invention into a film (below, referred to as a "film product") is 0.3 to 0.6 in range, preferably 0.3 to 0.5 in range. The loss tangent tan $\delta_{(50°\ C.)}$ at 50° C. is an indicator showing the fluidity. In particular, the effect of the low molecular weight components is reflected. If the loss tangent tan $\delta_{(50°\ C.)}$ is too small, the stretchability ends up deteriorating. On the other hand, if the loss tangent tan $\delta_{(50°\ C.)}$ is too large, the obtained adhesive layer ends up falling in strength and the abrasion resistance ends up deteriorating. Note that, the loss tangent tan $\delta_{(50°\ C.)}$ can, for example, be measured by casting and drying the latex of the present invention on a predetermined base material to obtain a thickness 0.1 mm to 0.6 mm highly saturated nitrile rubber film and measuring the obtained film using a dynamic viscoelasticity measuring device.

Further, in the latex of the present invention, the complex torque S* at the time of 100% shear strain at 100° C. of the film product is 20 dNm or less, preferably 5 to 19 dNm, particularly preferably 10 to 19 dNm. The complex torque S* at the time of 100% shear strain is the torque value at the time of making the film deform relatively largely and is an indicator showing the rigidity. If the complex torque S* at the time of 100% shear strain is too large, the obtained adhesive layer ends up becoming to hard to deform and the stretchability ends up deteriorating. Note that, the complex torque S* at the time of 100% shear strain can, for example, be measured by casting and drying the latex of the present invention on a predetermined base material to obtain a thickness 0.1 him to 0.7 him highly saturated nitrile rubber film and measuring the obtained film under conditions of a dynamic shear strain of 100% and measurement temperature of 100° C. using a dynamic viscoelasticiity measuring device.

Note that, the method of making the loss tangent tan $\delta_{(50°\ C.)}$ and complex torque S* at the time of 100% shear strain the above ranges is not particularly limited, but when producing the highly saturated nitrile rubber forming the latex of the present invention by emulsion polymerization, the method of not adding the molecular weight modifier at the time of start of polymerization, but adding the molecular weight modifier in the middle of the emulsion polymerization may be mentioned.

Further, in the latex of the present invention, in addition to the loss tangent tan $\delta_{(50°\ C.)}$ and complex torque S* at the time of 100% shear strain of the film product being in the above ranges, the following requirements are preferably also satisfied. Due to this, the obtained adhesive layer can be further improved in stretchability and abrasion resistance.

That is, in the present invention, the difference $\Delta \tan \delta = \tan \delta_{(150°\ C.)} - \tan \delta_{(50°\ C.)}$, which is a difference between the loss tangent $\tan \delta_{(50°\ C.)}$ at 50° C. and the loss tangent $\tan \delta_{(150°\ C.)}$ at 150° C. of the film product, is preferably 0.35 or less, more preferably 0.1 to 0.3. Note that, the loss tangent $\tan \delta_{(150°\ C.)}$ at 150° C. can be measured in the same way as the above loss tangent $\tan \delta_{(50°\ C.)}$ at 50° C.

Further, in the present invention, the storage modulus $G'_{(100°\ C.)}$ at 100° C. of the film product is preferably 200 kPa or less, more preferably 50 to 150 kPa. Note that, the storage modulus $G'_{(100°\ C.)}$ at 100° C. is an indicator showing the hardness. For example, by casting and drying the latex of the present invention on a predetermined base material, it is possible to obtain a thickness 0.1 mm to 0.6 mm highly saturated nitrile rubber film and the storage modulus $G'_{(100°\ C.)}$ at 100° C. can be measured by measuring the obtained film using a dynamic viscoelasticity measuring device.

Furthermore, in the present invention, the difference $\Delta G' = G'_{(50°\ C.)} - G'_{(150°\ C.)}$ which is a difference between the storage modulus $G'_{(50°\ C.)}$ at 50° C. and the storage modulus $G'_{(150°\ C.)}$ at 150° C. of the film product is preferably 350 kPa or less, more preferably 150 to 310 kPa. Note that, the storage modulus $G'_{(50°\ C.)}$ at 50° C. and the storage modulus $G'_{(150°\ C.)}$ at 150° C. of the film product can be measured in the same way as the above-mentioned the storage modulus $G'_{(100°\ C.)}$ at 100° C.

The highly saturated nitrile rubber forming the latex of the present invention is obtained by copolymerizing the above-mentioned monomers and, if necessary, hydrogenating the carbon-carbon double bonds in the obtained copolymer. The polymerization method is not particularly limited and may be the known emulsion polymerization method or solution emulsion method, but from the viewpoint of the industrial productivity, the emulsion polymerization method is preferable. At the time of emulsion polymerization, a normally used polymerization auxiliary material such as an emulsifier, polymerization initiator, molecular weight modifier etc. can be used.

The emulsifier is not particularly limited, but, for example, a nonionic emulsifier such as a polyoxyethylene alkyl ether, polyoxyethylene alkyl phenol ether, polyoxyethylene alkyl ester, and polyoxyethylene sorbitan alkyl ester; an anionic emulsifier such as a salt of a fatty acid such as myristic acid, palmitic acid, oleic acid, and linoleic acid, an alkyl benzene sulfonate such as sodium dedecylbenzene sulfonate, a higher alcohol sulfuric acid ester salt, and an alkyl sulfosuccinate; a copolymerizable emulsifier such as a sulfo ester of $\alpha,\beta$-unsaturated carboxylic acid, a sulfate ester of $\alpha,\beta$-unsaturated carboxylic acid, a sulfoalkylaryl ether; etc. may be mentioned. The amount of the emulsifier used is preferably 0.1 to 10 parts by weight with respect to 100 parts by weight of the monomers used for the polymerization, more preferably 0.5 to 8 parts by weight, particularly preferably 1 to 5 parts by weight.

The polymerization initiator is not particularly limited so long as a radical initiator, but an inorganic peroxide such as potassium persulfate, sodium persulfate, ammonium persulfate, potassium perphosphate, and hydrogen perchlorate; an organic peroxide such as t-butyl peroxide, cumen hydroperoxide, p-mentane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, and t-butyl peroxyisobutyrate; an azo compound such as azobisisobutyronitrile, azobis-2,4-dimethylvaleronitrile, azobiscyclohexane carbonitrile, and methyl azobis isobutyrate; etc. may be mentioned. These polymerization initiators can be used as single types alone or as a plurality of types. As the polymerization initiator, an inorganic or organic peroxide is preferable. When using a peroxide as a polymerization initiator comprised, it may be combined with a reducing agent such as sodium bisulfate or ferric sulfate and may be used as a redox type polymerization initiator. The amount of the polymerization initiator used is preferably 0.01 to 2 parts by weight with respect to 100 parts by weight of the monomers used for the polymerization.

Further, in the present invention, when copolymerizing the above-mentioned monomers by the emulsion polymerization method, it is preferable not to add the molecular weight modifier at the time of start of the emulsion polymerization, but to add the molecular weight modifier, after starting the emulsion polymerization, at the stage of a 5 to 60 wt % polymerization conversion rate. Due to this, in the obtained highly saturated nitrile rubber, it is possible to make the weight average molecular weight of the solubles in chloroform, loss tangent $\tan \delta_{(50°\ C.)}$, and complex torque S* at the time of 100% shear strain the above ranges.

That is, for example, when making the latex of the highly saturated nitrile rubber of the present invention one containing $\alpha,\beta$-ethylenically unsaturated nitrile monomer units, acid group-containing $\alpha,\beta$-ethylenically unsaturated monomer units, and diene monomer units and/or $\alpha$-olefin monomer units, it is preferable adopt a mode starting the emulsion polymerization of the monomer mixture containing the $\alpha,\beta$-ethylenically unsaturated nitrile monomer, acid group-containing $\alpha,\beta$-ethylenically unsaturated monomer, diene monomer and/or $\alpha$-olefin monomer without adding the molecular weight modifier, then, at the stage reaching a 5 to 60 wt % polymerization conversion rate, adding a later explained predetermined amount of a molecular weight modifier and continuing the emulsion polymerization.

The timing of adding the molecular weight modifier in the middle of the process is preferably a stage after starting emulsion polymerization when the polymerization conversion rate becomes 5 to 60 wt %, more preferably a stage when it becomes 15 to 45 wt %. Note that, the method of addition when adding the molecular weight modifier in the middle of the process is not particularly limited. The method of adding the molecular weight modifier to be added all at once or the method of adding it divided into several batches may be used. Note that, in the present invention, the molecular weight modifier is preferably added after the start of the emulsion polymerization in the middle of the emulsion polymerization and it is preferable not to add the molecular weight modifier at the time of start of emulsion polymerization, but it is sufficient to establish a state where no molecular weight modifier is substantially contained at the time of start of emulsion polymerization. For example, if 10 weight ppm or less, a compound acting as a molecular weight modifier may be included.

The molecular weight modifier is not particularly limited, but mercaptans such as t-dodecyl mercaptan, n-dodecyl mercaptan, and octyl mercaptan; halogenated hydrocarbons such as carbon tetrachloride, methylene chloride, and methylene bromide; a $\alpha$-methylstyrene dimer; sulfur-containing compounds such as tetraethylthiuram disulfide, dipentamethylenethiuram disulfide, and diisopropyl xantogen disulfide may be mentioned. These can be used as single types alone or as a plurality of types. Among these as well, a mercaptan is preferable, while t-dodecyl mercaptan is more preferable. The amount of use of the molecular weight modifier is preferably 1 to 3 parts by weight with respect to 100 parts by weight of the monomers used for the polymerization, more preferably 1 to 2 parts by weight.

For the medium of the emulsion polymerization, usually water is used. The amount of water is preferably 80 to 500 parts by weight with respect to 100 parts by weight of the monomers used for the polymerization, more preferably 80 to 300 parts by weight.

At the time of emulsion polymerization, further, in accordance with need, a polymerization auxiliary material such as a stabilizer, dispersant, pH adjuster, deoxidant, or particle size adjuster can be used. When using these, the types and amounts of use are not particularly limited.

Note that, the temperature of the emulsion polymerization is preferably 0 to 80° C., particularly preferably 0 to 30° C.

The latex of the highly saturated nitrile rubber of the present invention is preferably obtained by hydrogenating the latex of the nitrile rubber obtained by emulsion polymerization. Note that, when the amount of the conjugated diene monomer units in the nitrile rubber is small and, for this reason, the iodine value of the nitrile rubber obtained by the emulsion polymerization is the above-mentioned value or less, there is no need to perform the hydrogenation treatment.

The average particle size of the thus obtained latex is preferably 0.01 to 0.5 μm. Further, the solid content concentration of the latex is preferably 60 wt % or less for preventing agglomeration, more preferably 5 to 60 wt %, particularly preferably 10 to 50 wt %.

The hydrogenation may be performed by a known method. The hydrogenation may be performed by a known method. The oil layer hydrogenation method of coagulating the latex of nitrile rubber obtained by emulsion polymerization, then hydrogenating it by an oil layer, and the aqueous layer hydrogenation method of hydrogenating the latex obtained by polymerization as it is, etc. may be mentioned. Among these, the aqueous layer hydrogenation method is preferred.

At the time of hydrogenation of the nitrile rubber by the aqueous layer hydrogenation method, it is preferable to dilute a latex of nitrile rubber prepared by emulsion polymerization by adding water as needed and hydrogenate it. As the aqueous layer hydrogenation method, there are the aqueous layer direct hydrogenation method of hydrogenation by supplying hydrogen to a reaction system in the presence of a hydrogenation catalyst and the aqueous layer indirect hydrogenation method of hydrogenation by reduction in the presence of an oxidizing agent, reducing agent, and activating agent, but the aqueous layer direct hydrogenation method is more preferable.

The hydrogenation catalyst used for the aqueous layer direct hydrogenation method is not particularly limited so long as a compound which is difficult to break down in water, but, for example, a palladium catalyst etc. may be mentioned. As specific examples of the palladium catalyst, a palladium salt of a carboxylic acid such as formic acid, acetic acid, propionic acid, lauric acid, succinic acid, oleic acid, and phthalic acid; a chlorinated palladium such as palladium chloride, dichloro(cyclooctadiene)palladium, dichloro (norbornadiene)palladium, and ammonium hexachloropalladate (IV); an iodated palladium such as palladium iodide; palladium sulfate dehydrate, etc. may be mentioned. Among these as well, a palladium salt of a carboxylic acid, dichloro (norbornadiene)palladium, and ammonium hexachloropalladate (IV) are particularly preferable. The amount of use of a hydrogenation catalyst may be suitably determined, but is preferably 5 to 10,000 weight ppm with respect to the nitrile rubber before hydrogenation, more preferably 10 to 5,000 weight ppm.

The reaction temperature in the aqueous layer direct hydrogenation method is preferably 0 to 300° C., more preferably 20 to 150° C., particularly preferably 30 to 100° C. If the reaction temperature is too low, the reaction speed is liable to fall, while conversely if the reaction temperature is too high, there is a possibility of a secondary reaction such as hydrogenation of a nitrile group occurring.

The hydrogen pressure is preferably 0.1 to 30 MPa, more preferably 0.5 to 20 MPa. The reaction time is preferably 1 to 15 hours, particularly preferably 2 to 10 hours.

In the aqueous layer direct hydrogenation method, after the end of the hydrogenation reaction, usually the hydrogenation catalyst in the latex is removed. As the method of removal of the hydrogenation catalyst, for example, the method of adding an adsorbent such as activated carbon or an ion exchange resin to the latex after the end of the hydrogenation reaction and stirring so that the hydrogenation catalyst is adsorbed at the adsorbent, then separating the latex by filtration or centrifugation can be used. Further, it is also possible to add hydrogen perchlorate and dimethylglyoxime to the latex after the end of the hydrogenation reaction, adjust the pH to 8 to 11, and warm the mixture while stirring to make the hydrogenation catalyst precipitate as insolubles in the latex and remove the same. Note that, in the aqueous layer direct hydrogenation method, the hydrogenation catalyst need not be removed and may be left in the latex.

Adhesive Composition

The adhesive composition of the present invention contains the above-mentioned latex of a highly saturated nitrile rubber of the present invention.

In the adhesive composition of the present invention, the content of the highly saturated nitrile rubber (solid content) is preferably 5 to 50 wt %, particularly preferably 10 to 40 wt %.

The adhesive composition of the present invention preferably further contains an adhesive resin in addition to the above-mentioned latex of a highly saturated nitrile rubber of the present invention.

As the adhesive resin, a resorcinol formaldehyde resin, melamine resin, epoxy resin, and isocyanate resin may be suitably used, but among these, a resorcinol formaldehyde resin is preferable. As the resorcinol formaldehyde resin, a known one (for example, one disclosed in Japanese Patent Publication No. 55-142635A) can be used. The reaction ratio of the resorcine and formaldehyde is, by molar ratio of "resorcine:formaldehyde", normally 1:1 to 1:5, preferably 1:1 to 1:3.

The resorcinol formaldehyde resin is used in, based on dry weight, a ratio of preferably 5 to 30 parts by weight with respect to 100 parts by weight of the solid content of the above-mentioned latex of a highly saturated nitrile rubber of the present invention, more preferably 8 to 20 parts by weight. If the amount of the resorcinol formaldehyde resin is excessively large, the adhesive layer becomes too hard and the flexibility is impaired. Due to this, the composite obtained using the adhesive composition of the present invention sometimes falls in abrasion resistance.

Further, to further enhance the bonding strength of the adhesive composition of the present invention, in accordance with need, the conventionally used 2,6-bis(2,4-dihydroxyphenylmethyl)-4-chlorophenol or a similar compound, isocyanate, block isocyanate, ethylene urea, polyepoxide, modified polyvinyl chloride resin, etc. may be jointly used.

Furthermore, the adhesive composition of the present invention may contain a vulcanization aid. By a vulcanization aid being included, the composite obtained by using the adhesive composition of the present invention can be improved in mechanical strength. As the vulcanization aid, quinone dioximes such as p-quinone dioximes; methacrylic acid esters such as lauryl methacrylate or methyl methacrylate; allyl compounds such as TAC (triallyl cyanurate) and TALC (triallyl isocyanurate); maleimide compounds such as bismaleimide, phenyl maleimide, N,N-m-phenylene dimaleimide, 4,4'-diphenylmethane bismaleimide, bisphenol A diphenylether bismaleimide, 3,3'-dimethyl-5,5'-diethyl-4,4'-diphenylmethane bismaleimide, and N,N'-(4-methyl-1,3-phenylene)bis(maleinimide); allyl esters of polyhydric acids such as DAF (diallyl fumarate), DAP (diallyl phthalate), diallyl maleate, diallyl sebacate, and triallyl phosphate; diethylene glycol bisallyl carbonate; allyl ethers such as ethylene glycol diallyl ether, a triallyl ether of trimethylolpropane, and a partial allyl ether of pentaerythritol; allyl modified resins such as allylated novolac, allylated resol resin; tri- to pentafunctional methacrylate compounds or acrylate compounds such as trimethylolpropane trimethacrylate and trimethylolpropane triacrylate; sulfur; etc. may be mentioned.

Fiber Base Material-Highly Saturated Nitrile Rubber Composite

As a composite obtained by bonding by the adhesive composition of the present invention, for example, a fiber base material-highly saturated nitrile rubber composite including a fiber base material and a highly saturated nitrile rubber may be mentioned. Such a fiber base material-highly saturated nitrile rubber composite can normally be obtained by bonding a fiber base material and highly saturated nitrile rubber by the above-mentioned adhesive composition of the present invention.

Note that, below, the highly saturated nitrile rubber contained in the latex forming the adhesive composition of the present invention will be explained as the "adhesive highly saturated nitrile rubber" and the highly saturated nitrile rubber forming the rubber layer of the fiber base material-highly saturated nitrile rubber composite will be explained as the "adherend highly saturated nitrile rubber".

The form of the fiber base material-highly saturated nitrile rubber composite is not particularly limited. It is sufficient that it be one where an adhesive layer formed using the above-mentioned adhesive composition of the present invention is used to bond the fiber base material and adherend highly saturated nitrile rubber together. In particular, one comprised of a fiber base material and adherend highly saturated nitrile rubber bonded together, one comprised of an adherend highly saturated nitrile rubber in which part or all of the fiber base material is embedded, etc. may be mentioned.

The type of the fiber forming the fiber base material is not particularly limited. As specific examples, vinylon fiber, polyester fiber, polyamide fiber such as nylon and aramide (aromatic polyamide), PBO fiber, fluorine-based fiber, glass fiber, carbon fiber, cotton, rayon, etc. may be mentioned. These are suitably selected accord ng to the application. The shape of the fiber base material is not particularly limited. As specific examples, staple fibers, filaments, cords, ropes, woven fabrics (canvas etc.) and the like may be mentioned. This may be suitably selected in accordance with the application of the fiber base material-highly saturated nitrile rubber composite. For example, it is possible to use a fiber base material of a cord form to make a toothed belt made of the highly saturated nitrile rubber containing core yarns or possible to use a fiber base material of a base fabric form such as canvas to make a toothed belt made of the highly saturated nitrile rubber covered with a base fabric.

The adherend highly saturated nitrile rubber used for the fiber base material-highly saturated nitrile rubber composite is a copolymer obtained by using a conjugated diene and $\alpha,\beta$-ethylenically unsaturated nitrile as essential component monomers, if necessary, copolymerizing these essential component monomers with copolymerizable monomers, and hydrogenating the obtained copolymer according to need. As the copolymerizable monomers, ones similar to the above-mentioned adhesive highly saturated nitrile rubber can be mentioned.

As specific examples of the adherend highly saturated nitrile rubber, a highly saturated butadiene-acrylonitrile copolymer rubber, carboxyl group-containing highly saturated butadiene-acrylonitrile copolymer rubber, highly saturated isoprene-butadiene-acrylonitrile copolymer rubber, highly saturated isoprene-acrylonitrile copolymer rubber, highly saturated butadiene-acrylate methyl-acrylonitrile copolymer rubber, highly saturated butadiene-acrylate-acrylonitrile copolymer rubber, highly saturated butadiene-ethylene-acrylonitrile copolymer rubber, butyl acrylate-ethoxyethyl acrylate-vinyl norbornene-acrylonitrile copolymer rubber, etc. may be mentioned. Among these, in particular, when using a fiber base material-highly saturated nitrile rubber composite for automobile use, highly saturated butadiene-acrylonitrile copolymer rubber is preferable from the viewpoint of oil resistance and heat resistance.

The hydrogenation rate of the adherend highly saturated nitrile rubber is, by iodine value, 120 or less, preferably 100 or less, more preferably 80 or less. If the iodine value is too high, the obtained fiber base material-highly saturated nitrile rubber composite is liable to fall in heat resistance.

The content of the acrylonitrile monomer units of the adherend highly saturated nitrile rubber is preferably 10 to 60 wt %, more preferably 12 to 55 wt %, particularly preferably 15 to 50 wt %. If the content of the acrylonitrile monomer units is too small, the fiber base material-highly saturated nitrile rubber composite is liable to deteriorate in oil resistance, while conversely if the content of the acrylonitrile monomer units is too large, the cold resistance may fall.

Further, the Mooney viscosity ($ML_{1+4}$, 100° C.) of the adherend highly saturated nitrile rubber is preferably 10 to 300, more preferably 20 to 250, particularly preferably 30 to 200. If the Mooney viscosity is too low, the shapeability and mechanical properties are liable to fall, while if the Mooney viscosity is too high, the shapeability may fall.

The adherend highly saturated nitrile rubber may have suitably added to it a cross-linking agent such as sulfur, a peroxide-based cross-linking agent, or a polyamine-based cross-linking agent and also compounding agents usually blended in when processing rubber such as a filler such as carbon black, silica, and staple fibers; a cross-linking accelerator; antiaging agent; plasticizer; pigment; tackifier; processing aid; scorch retarder; or silane coupling agent.

The method of obtaining the fiber base material-highly saturated nitrile rubber composite is not particularly limited, but, for example, the method of using immersion etc. to deposit the above-mentioned adhesive composition of the present invention on a fiber base material, place this on the adherend highly saturated nitrile rubber, and heat and press this can be illustrated.

The pressing operation can be performed by using a press-forming machine, metal rolls, an injection molding machine, etc. The pressure of the pressing operation is preferably 0.5 to 20 MPa, more preferably 2 to 10 MPa, the heating temperature is preferably 130 to 300° C., more preferably 150 to 250° C., and the operation time is preferably 1 to 180 minutes, more preferably 5 to 120 minutes.

By this method, the adherend highly saturated nitrile rubber can be vulcanized and shaped and the fiber base material and adherend highly saturated nitrile rubber can be bonded simultaneously.

Note that, in this case, the inside surface of the die of the press or the surface of the roll may be formed with a shape for realizing the target surface shape so that the adherend highly saturated nitrile rubber forming the fiber base material-highly saturated nitrile rubber composite is given a desired surface shape.

Further, as one form of the fiber base material-highly saturated nitrile rubber, a fiber base material-highly saturated nitrile rubber-fiber base material composite can be mentioned. The fiber base material-highly saturated nitrile rubber-fiber base material composite is, for example, a combination of a fiber base material (the fiber base material may be composite of two or more types of fiber base materials) and a fiber base material-highly saturated nitrile rubber composite. The fiber base material-highly saturated nitrile rubber-fiber base material composite can, for example, be obtained by depositing the adhesive composition of the present invention on a fiber base material comprised of core yarns and a base fabric comprised of a fiber base material and stacking and hot pressing core yarns on which the adhesive composition is deposited, the highly saturated nitrile rubber to be adhered, and the fiber base material on which the adhesive composition is deposited.

The fiber base material treated by the adhesive composition of the present invention is excellent in abrasion resistance and dynamic fatigue resistance. Further, the adherend highly saturated nitrile rubber is excellent in oil resistance, heat resistance, etc., so the fiber base material-highly saturated nitrile rubber composite obtained using the adhesive composition of the present invention is suitable for use as members contacting oil in automobiles, in particular, as belts, flat belts, V-belts, V-ribbed belts, round belts, corner belts, toothed belts, in-oil belts, etc.

Further, the fiber base material-highly saturated nitrile rubber composite obtained using adhesive composition of the present invention can be suitably used for hoses, tubes, diaphragms, etc. As hoses, single-tube rubber hoses, multi-layer rubber hoses, braided type reinforced hoses, wrapped type reinforced hoses, etc. may be mentioned. As diaphragms, flat type diaphragms, rolling type diaphragms, etc. may be mentioned.

The fiber base material-highly saturated nitrile rubber composite obtained by using the adhesive composition of the present invention can be used as industrial products such as seals and rubber rolls in addition to the above application. As seals, seals for moving parts such as rotating, rocking, and reciprocating parts and seals for fixed parts may be mentioned. As moving part seals, oil seals, piston seals, mechanical seals, boots, dust covers, diaphragms, accumulators, etc. may be mentioned. As fixed part seals, O-rings, various types of gaskets, etc. may be mentioned. As rubber rolls, rolls used as parts of office automation equipment such as printers and copiers; fiber processing rolls such as spinning-use draw rolls and spinning-use draft rolls; ironmaking rolls such as bridle rolls, snapper rolls, and steering rolls; etc. may be mentioned.

EXAMPLES

Below, examples and comparative examples will be given to specifically explain the present invention. Below, "parts" are based on weight unless otherwise indicated. Note that, the tests and evaluations were conducted by on the following method.

Iodine Value

An excess amount of methanol was added to a latex of the highly saturated nitrile rubber and the precipitated rubber was taken out and dried under reduced pressure at 60° C. for 24 hours to thereby obtain highly saturated nitrile rubber. Further, the obtained highly saturated nitrile rubber was used for measurement in accordance with JIS K 6235.

Weight Average Molecular Weight Mw of Chloroform Solubles

A latex of the highly saturated nitrile rubber was cast on a glass sheet and dried by allowing it to stand at 20° C. for 72 hours. Further, the film formed by drying was peeled off from the glass sheet. The peeled off film was further dried under reduced pressure at 60° C. for 24 hours to thereby obtain a thickness approximately 0.3 mm highly saturated nitrile rubber film (film product). This film was immersed in chloroform and allowed to stand there at 25° C. for 48 hours to make it dissolve, then the result was passed through a membrane filter (pore size 0.5 μm), then was measured by gel permeation chromatography under the following conditions to obtain the weight average molecular weight Mw of the chloroform soluble. Note that, Mw is converted to standard polystyrene.

Measuring device: HLC-8220 (made by Toso)
Column: two columns of product name "GMH-HR-H" (made by Toso) and one column of product name "G3000H-HR" (made by Toso) connected in series.
Detector: refractive index detector
Eluent: chloroform
Column temperature: 40° C.

Loss Tangent tan δ and Storage Modulus G'

The same procedure was followed as in the above measurement of the weight average molecular weight and molecular weight distribution to obtain a film of the highly saturated nitrile rubber of a thickness of approximately 0.3 LEI (film product). Further, the obtained film was used for measurement using a dynamic viscoelasticity measuring device: product name "RPA2000" (made by Alpha Technologies). The film was cut into pieces matching the die shape and superposed to about 5 g. It was measured at a dynamic shear strain 6.98%, frequency 1.7 Hz for loss tangents $\tan \delta_{(50° C.)}$ at 50° C., $\tan \delta_{(100° C.)}$ at 100° C., $\tan \delta_{(150° C.)}$ at 150° C. and storage modulus $G'_{(50° C.)}$ at 50° C., $G'_{(100° C.)}$ at 100° C., and $G'_{(150° C.)}$ at 150° C. Furthermore, $\Delta \tan \delta$ and $\Delta G'$ were found in the following formulas:

$$\Delta \tan \delta = (\tan \delta_{(150° C.)} \text{ at } 150° C.) - (\tan \delta_{(50° C.)} \text{ at } 50° C.)$$

$$\Delta G' = (G'_{(50° C.)} \text{ at } 50° C.) - (G'_{(150° C.)} \text{ at } 150° C.)$$

Complex Torque S* at Time of 100% Shear Strain

The same procedure was followed as in the above measurement of the weight average molecular weight to obtain a film of the highly saturated nitrile rubber of a thickness of approximately 0.3 mm (film product). Further, the obtained film was used for measurement using a dynamic viscoelasticity measuring device: product name "RPA2000" (made by Alpha Technologies). The film was cut into pieces matching the die shape and superposed to about 5 g. It was measured at a dynamic shear strain 100%, frequency 1 Hz, and 100° C. for complex torque S* at time of 100% shear strain at 100° C.

Tensile Test of Adhesive Composition-Treated Fiber Base Material

The adhesive composition-treated nylon base material was cut into a strip of a width of 2.5 cm and length of 10 cm to obtain a test piece. A tensile tester was used to conduct a tensile test on this strip-shaped test piece at 50 mm/min in speed. In this test, the distance between the chucks at the time of start of the test was made 4.4 cm. The time when the distance between the chucks became 6.6 cm was deemed 50% stress. The load at this time was found. The lower this load, the easier it is for the adhesive composition-treated fiber base material to deform, the easier it is to form a complicated fiber-rubber composite, and the better the stretchability.

Abrasion Resistance Test of Fiber Base Material-Highly Saturated Nitrile Rubber Composite A fiber base material-highly saturated nitrile rubber composite was tested for abrasion resistance using a carpet-use taber abrasion tester. The test was conducted under conditions of a load of 1 kg, an abraded surface temperature of 120° C. (by irradiation by infrared lamp), and a disk rotation speed of 10,000. The criteria for evaluation were as follows: The higher the value of the evaluation criteria, the better the abrasion resistance.

5: Abrasion not observed or abrasion observed, but in 25% or less of surface area of nylon 4: Abrasion observed in more than 25%, 50% or less in range of surface area of nylon base material 3: Abrasion observed in more than 50%, 75% or less in range of surface area of nylon base material 2: Abrasion observed in more than 75%, 90% or less in range of surface area of nylon base material 1: Abrasion observed in more than 90% in range of surface area of nylon base material Example 1

Production of Latex (L1) of the Highly Saturated Nitrile Rubber (A1)

To a reactor, 180 parts of ion exchange water, 25 parts of concentration 10 wt % sodium dedecylbenzene sulfonate aqueous solution, 35 parts of acrylonitrile, and 4 parts of methacrylic acid were charged in that order. The inside gas was replaced with nitrogen 3 times, then the inside was charged with 61 parts of 1,3-butadiene. The reactor was held at 10° C., 0.1 part of cumen hydroperoxide (polymerization initiator) was charged, the polymerization reaction was made to start, and the mixture was stirred while continuing the polymerization reaction. When the polymerization conversion rate reached 20%, 1.5 parts of t-dodecyl mercaptan (molecular weight modifier) was added and the polymerization reaction further continued. When the polymerization conversion rate became 90%, 0.1 part of concentration 10 wt % hydroquinone aqueous solution (polymerization terminator) was added to stop the polymerization reaction. Next, at a water temperature of 60° C., the residual monomer was removed to obtain a latex of nitrile rubber (X1) (solid content concentration about 30 wt %).

Further, in an autoclave, the latex of the nitrile rubber (X1) and a palladium catalyst (solution of 1 wt % palladium acetate acetone solution and equal weight of ion exchange water mixed together) were added so that the palladium content with respect to the dry weight of rubber contained in the latex of the above obtained nitrile rubber (X1) became 1,000 weight ppm. The mixture was hydrogenated by reaction at a hydrogen pressure of 3 MPa and a temperature of 50° C. for 6 hours. Then, a latex (L1) of the highly saturated nitrile rubber (A1) (solid content concentration 30 wt %) was obtained by adjusting the solid content concentration of the hydrogenated mixture.

The ratios of content of the monomer units of the highly saturated nitrile rubber (A1) were found by $^1$H-NMR measurement, whereupon they were 34.2 wt % of acrylonitrile units, 3.3 wt % of methacrylic acid units, and 62.5 wt % of 1,3-butadiene units (including hydrogenated parts as well). Further, the iodine value was 28. Further, in accordance with the above methods, the weight average molecular weight Mw of the chloroform soluble, loss tangent tan δ, storage modulus G', and complex torque S* at the time of 100% shear strain were measured. Further, the Δ tan δ and the ΔG' were found by calculation. The results are shown in Table 1.

Preparation of Adhesive Composition 6.5 parts of resorcine, 9.4 parts of formaldehyde (concentration 37%), and 3 parts of sodium hydroxide (concentration 10%) were dissolved in 139.6 parts of water and reacted at 25° C. for 6 hours to obtain a resorcinol formaldehyde resin solution (RF solution).

Further, to 60.9 parts of the latex (L1) of the highly saturated nitrile rubber (A1) (solid content concentration 30%) which is above produced, 27.7 parts of the resorcinol formaldehyde resin solution (RF solution) which is above prepared and 11.4 parts of distilled water were added. The mixture was stirred at room temperature for 1 minute, then was aged at 25° C. for 24 hours to thereby obtain an adhesive composition (LS1).

Preparation of Adhesive Composition-Treated Fiber Base Material

A fiber base material comprised of a base fabric made of nylon 66 was dipped in the above obtained adhesive composition (LS1) and pulled up to thereby coat the base fabric with the adhesive composition. At this time, the rubber in the adhesive composition was deposited to 20 parts with respect to 100 parts of the base fabric of nylon 66. Next, the base fabric coated with the adhesive composition was heated by an air-circulation type oven at 110° C. for 10 minutes, then heated at 150° C. for 3 minutes to make it cure and thereby obtain an adhesive composition-treated fiber base material (adhesive composition-treated nylon base material). Further, the obtained adhesive composition-treated fiber base material was tested for tensile strength in accordance with the above method. The results are shown in Table 1.

Preparation of Fiber Base Material-Highly Saturated Nitrile Rubber Composite

Further, separate from the above, to 400 parts of the adhesive composition (LS1) which is above obtained, 40 parts of an aqueous dispersion of HAF carbon (product name "Seast 3", made by Tokai Carbon) (25 wt % concentration) was added to obtain an HAF carbon mixture, then a fiber base material comprised of a base fabric made of nylon 66 was dipped in the obtained HAF carbon mixture and pulled up to thereby coat the base fabric with the adhesive composition. At this time, the rubber in the adhesive composition was deposited to 20 parts with respect to 100 parts of the base fabric of nylon 66. Next, the base fabric coated with the adhesive composition was heated by an air-circulation type oven at 150° C. for 3 minutes to obtain a base fabric pretreated by an adhesive composition.

Next, the rubber formulation prepared by kneading each formulation described in Table 2 by a Bambury mixer for 15 minutes was placed on the base fabric 15 cm×15 cm pretreated with the above obtained adhesive composition, spread by rolls to a thickness of 1 mm, then pressed by a press by a pressure of 0.1 MPa and temperature of 160° C. for 30 minutes to thereby obtain a fiber base material-highly saturated nitrile rubber composite (nylon base material-rubber composite). Further, the obtained fiber base material-highly saturated nitrile rubber composite was tested for abrasion resistance in accordance with the above method. The results are shown in Table 1.

Example 2

Except for changing the temperature of the polymerization reactor from 10° C. to 15° C. and changing the amount of addition of t-dodecyl mercaptan at the point of time when the polymerization conversion rate reached 20% from 1.5 parts to 1.2 parts, the same procedure was followed as in Example 1 to obtain a latex (L2) of the highly saturated nitrile rubber (A2) (solid content concentration 30 wt %). The ratios of content of the monomer units of the highly saturated nitrile rubber (A2) were 33.5 wt % of acrylonitrile units, 3.5 wt % of methacrylic acid units, and 63.0 wt % of 1,3-butadiene units (including hydrogenated parts as well), and the iodine value was 37. Further, the same procedure was followed as in Example 1 for performing the different measurements. The results are shown in Table 1.

Further, except for using, instead of the latex (L1) of the highly saturated nitrile rubber (A1), the above obtained latex (L2) of the highly saturated nitrile rubber (A2), the same procedure was followed as in Example 1 to obtain an adhesive composition, adhesive composition-treated fiber base material, and fiber base material-highly saturated nitrile rubber composite and the same procedure was followed to evaluate them. The results are shown in Table 1.

Example 3

Except for changing the timing of addition of 1.5 parts of t-dodecyl mercaptan to from the point of time when the polymerization conversion rate reached 20% to the point of time when the polymerization conversion rate reached 40%, the same procedure was followed as in Example 1 to obtain a latex (L3) of the highly saturated nitrile rubber (A3) (solid content concentration 30 wt %). The ratios of content of the monomer units of the highly saturated nitrile rubber (A3) were 33.8 wt % of acrylonitrile units, 3.5 wt % of methacrylic acid units, and 62.7 wt % of 1,3-butadiene units (including hydrogenated parts as well), and the iodine value was 45. Further, the same procedure was followed as in Example 1 for performing the different measurements. The results are shown in Table 1.

Further, except for using the latex (L1) of the highly saturated nitrile rubber (A1), the above obtained latex (L3) of the highly saturated nitrile rubber (A3), the same procedure was followed as in Example 1 to obtain an adhesive composition, adhesive composition-treated fiber base material, and fiber base material-highly saturated nitrile rubber composite and the same procedure was followed to evaluate them. The results are shown in Table 1.

Example 4

Except for changing the temperature of the polymerization reactor from 10° C. to 15° C. and changing the amount of addition of t-dodecyl mercaptan when the polymerization conversion rate became 20% from 1.5 parts to 1.2 parts, the same procedure was followed as in Example 1 to obtain a latex (L4) of the highly saturated nitrile rubber (A4) (solid content concentration 30 wt %). The ratios of content of the monomer units of the highly saturated nitrile rubber (A4) were 34.4 wt % of acrylonitrile units, 3.2 wt % of methacrylic acid units, and 62.4 wt % of 1,3-butadiene units (including hydrogenated parts as well), and the iodine value was 44. Further, the same procedure was followed as in Example 1 for performing the different measurements. The results are shown in Table 1.

Further, except for using, instead of the latex (L1) of the highly saturated nitrile rubber (A1), the above obtained latex (L4) of the highly saturated nitrile rubber (A4), the same procedure was followed as in Example 1 to obtain an adhesive composition, adhesive composition-treated fiber base material, and fiber base material-highly saturated nitrile rubber composite and the same procedure was followed to evaluate them. The results are shown in Table 1.

Example 5

Except for changing the amount of the acrylonitrile from 35 parts to 42 parts and the amount of 1,3-butadiene from 61 parts to 54 parts, the same procedure was followed as in Example 1 to obtain a latex (L5) of a highly saturated nitrile rubber (A5) (solid content concentration 30 wt %). The ratios of content of the monomer units of the highly saturated nitrile rubber (A5) were 40.1 wt % of acrylonitrile units, 3.2 wt % of methacrylic acid units, and 56.7 wt % of 1,3-butadiene units (including hydrogenated parts as well), and the iodine value was 31. Further, the same procedure was followed as in Example 1 for performing the different measurements. The results are shown in Table 1.

Further, except for using, instead of the latex (L1) of the highly saturated nitrile rubber (A1), the above obtained latex (L5) of the highly saturated nitrile rubber (A5), the same procedure was followed as in Example 1 to obtain an adhesive composition, adhesive composition-treated fiber base material, and fiber base material-highly saturated nitrile rubber composite and the same procedure was followed to evaluate them. The results are shown in Table 1.

Comparative Example 1

To a reactor, 180 parts of ion exchange water, 25 parts of concentration 10 wt % sodium dedecylbenzene sulfonate aqueous solution, 35 parts of acrylonitrile, 4 parts of methacrylic acid, and 0.5 part of t-dodecyl mercaptan (molecular weight modifier) were charged in that order. The inside gas was replaced with nitrogen 3 times, then the inside was charged with 61 parts of 1,3-butadiene. The reactor was held at 10° C., 0.1 part of cumen hydroperoxide (polymerization initiator) was charged, the polymerization reaction was made to start, and the mixture was stirred while continuing the polymerization reaction. When the polymerization conversion rate reached 90%, 0.1 part of concentration 10 wt % hydroquinone aqueous solution (polymerization terminator) was added to stop the polymerization reaction. Next, at a water temperature of 60° C., the residual monomer was removed to obtain a latex of nitrile rubber (X6) (solid content concentration about 30 wt %).

Further, in an autoclave, the latex of nitrile rubber (X6) and a palladium catalyst (solution of 1 wt % palladium acetate acetone solution and equal weight of ion exchange water mixed together) were added so that the palladium content with respect to the dry weight of the rubber contained in the obtained latex of the nitrile rubber (X6) became 1,000 weight ppm. The mixture was hydrogenated by reaction at a hydrogen pressure of 3 MPa and temperature of 50° C. for 6 hours and adjusted in solid content concentration to obtain a latex (L6) of the highly saturated nitrile rubber (A6) (solid content concentration 30 wt %). The ratios of content of the monomer units of the highly saturated nitrile rubber (A6) were 34.1 wt % of acrylonitrile units, 3.4 wt % of methacrylic acid units, and 62.5 wt % of 1,3-butadiene units (including hydrogenated parts as well), and the iodine value was 31. Further, the same procedure was followed as in Example 1 for performing the different measurements. The results are shown in Table 1.

Further, except for using, instead of the latex (L1) of the highly saturated nitrile rubber (A1), the above obtained latex (L6) of the highly saturated nitrile rubber (A6), the same procedure was followed as in Example 1 to obtain an adhesive composition, adhesive composition-treated fiber base material, and fiber base material-highly saturated nitrile rubber composite and the same procedure was followed to evaluate them. The results are shown in Table 1.

Comparative Example 2

Except for changing the amount of t-dodecyl mercaptan at the start of polymerization from 0.5 part to 0.8 part, the same procedure was followed as in Comparative Example 1 to obtain a latex (L7) of a highly saturated nitrile rubber (A7) (solid content concentration 30 wt %). The ratios of content of the monomer units of the highly saturated nitrile rubber (A7) were 34.0 wt % of acrylonitrile units, 3.3 wt % of methacrylic acid units, 62.7 wt % of 1,3-butadiene units (including hydrogenated parts), and the iodine value was 38. Further, the same procedure was followed as in Example 1 for performing the different measurements. The results are shown in Table 1.

Further, except for using, instead of the latex (L1) of the highly saturated nitrile rubber (A1), the above obtained latex (L7) of the highly saturated nitrile rubber (A7), the same procedure was followed as in Example 1 to obtain an adhesive composition, adhesive composition-treated fiber base material, and fiber base material-highly saturated nitrile rubber composite and the same procedure was followed to evaluate them. The results are shown in Table 1.

Comparative Example 3

Except for changing the amount of the t-dodecyl mercaptan at the time of start of polymerization from 0.5 part to 1.5 parts, the same procedure was followed as in Comparative Example 1 to obtain a latex (L8) of a highly saturated nitrile rubber (A8) (solid content concentration 30 wt %). The ratios of content of the monomer units of the highly saturated nitrile rubber (A8) were 33.7 wt % of acrylonitrile units, 3.5 wt % of methacrylic acid units, and 62.8 wt % of 1,3-butadiene units (including hydrogenated parts as well), and the iodine value was 47. Further, the same procedure was followed as in Example 1 for performing the different measurements. The results are shown in Table 1.

Further, except for using, instead of the latex (L1) of the highly saturated nitrile rubber (A1), the obtained latex (L8) of the highly saturated nitrile rubber (A8), the same procedure was followed as in Example 1 to obtain an adhesive composition, adhesive composition-treated fiber base material, and fiber base material-highly saturated nitrile rubber composite and the same procedure was followed to evaluate them. The results are shown in Table 1.

TABLE 1

| | | Example | | | | | Comparative Example | | |
|---|---|---|---|---|---|---|---|---|---|
| | | 1 | 2 | 3 | 4 | 5 | 1 | 2 | 3 |
| Type of latex | | L1 | L2 | L3 | L4 | L5 | L6 | L7 | L8 |
| Production conditions of latex | | | | | | | | | |
| Polymerization temperature | (° C.) | 10 | 15 | 10 | 15 | 10 | 10 | 10 | 10 |
| Amount of addition of molecular weight adjuster at time of start of polymerization | (parts) | 0 | 0 | 0 | 0 | 0 | 0.5 | 0.8 | 1.5 |
| Amount of addition of molecular weight adjuster at time of polymerization conversion rate of 20% | (parts) | 1.5 | 1.2 | 0 | 1.2 | 1.5 | 0 | 0 | 0 |
| Amount of addition of molecular weight adjuster at time of polymerization conversion rate of 40% | (parts) | 0 | 0 | 1.5 | 0 | 0 | 0 | 0 | 0 |
| Composition of the highly saturated nitrile rubber | | | | | | | | | |
| Acrylonitrile units | (wt %) | 34.2 | 33.5 | 33.8 | 34.4 | 40.1 | 34.1 | 34 | 33.7 |
| 1,3-butadiene units (including hydrogenated parts) | (wt %) | 62.5 | 63 | 62.7 | 62.4 | 56.7 | 62.5 | 62.7 | 62.8 |
| Methacrylic acid units | (wt %) | 3.3 | 3.5 | 3.5 | 3.2 | 3.2 | 3.4 | 3.3 | 3.5 |
| Iodine value of the highly saturated nitrile rubber | | 28 | 37 | 45 | 44 | 31 | 31 | 38 | 47 |
| Weight average molecular weight of chloroform solubles | | 52.500 | 66,000 | 34,900 | 51,500 | 48.200 | 179,500 | 131,100 | 74,000 |
| Physical properties of film product | | | | | | | | | |
| Loss tangent tan $\delta_{(50° C.)}$ at 50° C. | | 0.427 | 0.398 | 0.447 | 0.404 | 0.44 | 0.22 | 0.266 | 1.07 |
| Loss tangent tan $\delta_{(100° C.)}$ at 100° C. | | 0.672 | 0.641 | 0.71 | 0.659 | 0.652 | 0.434 | 0.554 | 0.43 |
| Loss tangent tan $\delta_{(150° C.)}$ at 150° C. | | 0.694 | 0.663 | 0.733 | 0.684 | 0.698 | 0.531 | 0.813 | 1.72 |
| $\Delta$ tan $\delta$ = tan $\delta_{(150° C.)}$ − tan $\delta_{(50° C.)}$ | | 0.267 | 0.265 | 0.286 | 0.28 | 0.258 | 0.311 | 0.547 | 0.65 |

TABLE 1-continued

|  |  | Example | | | | | Comparative Example | | |
|---|---|---|---|---|---|---|---|---|---|
|  |  | 1 | 2 | 3 | 4 | 5 | 1 | 2 | 3 |
| Storage modulus $G'_{(50°\ C.)}$ at 50° C. | (kPa) | 306.9 | 316.8 | 308.8 | 301.8 | 340.3 | 548.3 | 505.2 | 130.1 |
| Storage modulus $G'_{(100°\ C.)}$ at 100° C. | (kPa) | 98.9 | 110.8 | 100.5 | 97.7 | 115.5 | 291.4 | 209.1 | 61.2 |
| Storage modulus $G'_{(150°\ C.)}$ at 150° C. | (kPa) | 40.81 | 45.9 | 38.8 | 40.32 | 41.2 | 184.4 | 77.1 | 41.7 |
| $\Delta\ G' = G'_{(50°\ C.)} - G'_{(150°\ C.)}$ | (kPa) | 266.09 | 270.9 | 270 | 261.48 | 299.1 | 363.9 | 428.1 | 88.4 |
| Complex torque S* at time of 100% shear strain at 100° C. | (dNm) | 16.2 | 17.8 | 14.3 | 15.3 | 14.8 | 28.6 | 24.9 | 2.7 |
| Results of evaluation | | | | | | | | | |
| Load at time of 50% stretching of adhesive composition-treated fiber base material | (kg-weight) | 1.71 | 1.78 | 1.88 | 2.05 | 1.93 | 3.3 | 2.81 | 0.07 |
| Abrasian resistance of fiber base material-highly saturated nitrile rubber composite |  | 5 | 5 | 5 | 5 | 5 | 5 | 3 | 1 |

TABLE 2

| Table 2 | | |
|---|---|---|
| Zetpol2020L (*1) | (parts) | 70 |
| Zeoforte ZSC2295L (*2) | (parts) | 30 |
| SRF carbon black (*3) | (parts) | 20 |
| Zinc white (*4) | (parts) | 10 |
| Trimellitic acid ester (*5) | (parts) | 5 |
| 4,4'-bis(α,α'-dimethylbenzyl)diphenylamine (*6) | (parts) | 1.5 |
| Nocrac MBZ (*7) | (parts) | 1.5 |
| Peroxymon F-40 (*8) | (parts) | 6 |

(*1) Saturated nitrile rubber, iodine value 28, 36.2 wt % of acrylonitrile monomer units (made by Zeon Corporation)
(*2) High saturated nitrile rubber composition containing zinc methacrylate (made by Zeon Corporation)
(*3) Product name "Seast S" (made by Tokai Carbon)
(*4) Zinc White No. 1 (ZnO#), made by Seido Chemical Industry
(*5) Product name "ADK Cizer C-8", made by ADEKA
(*6) Product name "Nocrac CD", made by Ouchi Shinko Chemical Industrial
(*7) Product name "Nocrac MBZ", made by Ouchi Shinko Chemical Industrial
(*8) Product name "Peroxymon F-40", organic peroxide cross-linking agent (made by NOF Corporation)

From Table 1, when using an adhesive composition of the present invention containing a predetermined latex of the highly saturated nitrile rubber of the present invention, the obtained fiber base material was excellent in stretchability. Further, the obtained fiber base fabric-highly saturated nitrile rubber composite was excellent in abrasion resistance (Examples 1 to 5).

As opposed to this, when using a latex of the highly saturated nitrile rubber comprised of one where the weight average molecular weight of the solubles in chloroform is over 100,000, the loss tangent tan $\delta_{(50°\ C.)}$ at 50° C. when made into a film is less than 0.3, and the complex torque S* at the time of 100% shear strain at 100° C. is over 20 dNm, the obtained fiber base material was large in load at the time of 50% stretching and was inferior in stretchability (Comparative Examples 1 and 2).

Further, when using a latex of the highly saturated nitrile rubber comprised of one where the loss tangent tan $\delta_{(50°\ C.)}$ at 50° C. when made into a film is over 0.6, the obtained fiber base fabric-highly saturated nitrile rubber composite was extremely inferior in abrasion resistance (Comparative Example 3).

The invention claimed is:

1. An adhesive composition comprising a latex of a highly saturated nitrile rubber,
    wherein the highly saturated nitrile rubber contains α,β-ethylenically unsaturated nitrile monomer units in a ratio of 10 to 60 wt % and diene monomer units in a ratio of 40 wt % or more, has an iodine value of 120 or less, and has a weight average molecular weight of solubles in chloroform of 100,000 or less,
    when removing volatiles contained in the latex and making a film of the highly saturated nitrile rubber, a loss tangent tan $\delta_{(50°\ C.)}$ at 50° C. of the film is 0.3 to 0.6 and a complex torque S* at the time of 100% shear strain at 100° C. of the film is 20 dNm or less, and
    the highly saturated nitrile rubber is obtained through a polymerization with a molecular weight modifier added at a middle stage during which a polymerization conversion rate is in a range of 15 to 60 wt % such that the loss tangent tan $\delta_{(50°\ C.)}$ is 0.3 to 0.6 and the complex torque S* is 20 dNm or less.

2. The adhesive composition according to claim 1, further comprising a resorcinol formaldehyde resin.

3. The adhesive composition according to claim 2, wherein a content of the resorcinol formaldehyde resin is 5 to 30 parts by weight with respect to 100 parts by weight of a solid content of the latex of a highly saturated nitrile rubber.

4. The adhesive composition according to claim 1, wherein the highly saturated nitrile rubber contains the diene monomer units in a ratio of 40 to 89.9 wt %.

5. A fiber base material-highly saturated nitrile rubber composite obtained by bonding a fiber base material and a highly saturated nitrile rubber using the adhesive composition according to claim 1.

6. The adhesive composition according to claim 1, wherein the middle stage is a stage during which the polymerization conversion rate is in a range of 15 to 45 wt %.

7. The adhesive composition according to claim 1, wherein the middle stage is a stage during which the polymerization conversion rate is in a range of 20 to 40 wt %.

* * * * *